(12) United States Patent
Araki

(10) Patent No.: US 9,027,684 B2
(45) Date of Patent: May 12, 2015

(54) VEHICULAR BATTERY MOUNTING STRUCTURE

(75) Inventor: Kosuke Araki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/344,884

(22) PCT Filed: Sep. 12, 2012

(86) PCT No.: PCT/IB2012/001766
§ 371 (c)(1),
(2), (4) Date: Mar. 13, 2014

(87) PCT Pub. No.: WO2013/038255
PCT Pub. Date: Mar. 21, 2013

(65) Prior Publication Data
US 2014/0291046 A1    Oct. 2, 2014

(30) Foreign Application Priority Data

Sep. 14, 2011    (JP) ................................. 2011-201173

(51) Int. Cl.
*B60R 16/04* (2006.01)
*B60K 1/04* (2006.01)
*B62D 25/20* (2006.01)

(52) U.S. Cl.
CPC . *B60K 1/04* (2013.01); *B62D 25/20* (2013.01); *B60K 2001/0438* (2013.01)

(58) Field of Classification Search
USPC ............................. 180/68.5, 65.1, 58, 60, 311
See application file for complete search history.

(56) References Cited

U.S. PATENT DOCUMENTS

| 4,058,182 | A | * | 11/1977 | Huber ........................... 180/274 |
| 7,086,492 | B2 | * | 8/2006 | Kawasaki et al. ............. 180/274 |
| 2004/0035632 | A1 | | 2/2004 | Kawasaki et al. |
| 2006/0113128 | A1 | | 6/2006 | Sato et al. |

FOREIGN PATENT DOCUMENTS

| EP | 2070754 A1 | 6/2009 |
| JP | 10-119814 A | 5/1998 |
| JP | 2004-082793 A | 3/2004 |
| JP | 2006-151130 A | 6/2006 |
| JP | 2006-168604 A | 6/2006 |

* cited by examiner

*Primary Examiner* — Hau Phan
*Assistant Examiner* — Bryan Evans
(74) *Attorney, Agent, or Firm* — Gifford, Krass, Sprinkle, Anderson & Citkowski, P.C.

(57) ABSTRACT

A vehicular battery mounting structure (10) includes a floor panel (14), a battery frame (30) arranged below the floor panel (14), and a bracket (40) provided on both left and right sides of a vehicle, interposed between the floor panel (14) and the battery frame (30). The bracket (40) includes a bottom wall portion (42), an inside flange portion (48) that is on an inside in a vehicle width direction, and an outside flange portion (50) that is on an outside in the vehicle width direction. A shape of the bracket is a generally hat-shape opening upward in the sectional view taken along the vehicle width direction. The battery frame (30) is indirectly or directly fixed to the bottom wall portion (42). The inside and outside flange portions (48, 50) are joined to the floor panel (14) such that a joint strength between the outside flange portion (50) and the floor panel (14) is greater than a joint strength between the inside flange portion (48) and the floor panel (14).

8 Claims, 4 Drawing Sheets

VEHICULAR BATTERY MOUNTING STRUCTURE

BACKGROUND OF THE INVENTION

1. Field of the Invention

The invention relates to a vehicular battery mounting structure.

2. Description of Related Art

Japanese Patent Application Publication No. 10-119814 (JP 10-119814 A), for example, describes a battery mounting structure in which a battery is mounted below a floor panel in a vehicle. As one such structure, a battery frame that supports a battery may be fixed to a floor panel via a connecting member, for example.

However, in this type of structure, if a joint where the connecting member is joined to the floor panel breaks when a side collision of the vehicle occurs, the battery frame may separate from the floor panel as a result.

SUMMARY OF THE INVENTION

The invention thus provides a vehicular battery mounting structure capable of preventing or effectively inhibiting separation of a battery frame from a floor panel.

One aspect of the invention relates to a vehicular battery mounting structure that includes a floor panel that forms a vehicle body floor; a battery frame that is arranged below the floor panel and supports a battery; and a bracket that is provided on both left and right sides of a vehicle, interposed between the floor panel and the battery frame. The battery includes a bottom wall portion, an inside flange portion that is on an inside in a vehicle width direction, and an outside flange portion that is on an outside in the vehicle width direction. A sectional shape of the bracket is a generally hat-shape opening upward in a sectional view taken along the vehicle width direction. The battery frame is indirectly or directly fixed to the bottom wall portion. The inside flange portion and the outside flange portion are joined to the floor panel such that a joint strength between the outside flange portion and the floor panel is greater than a joint strength between the inside flange portion and the floor panel.

According to this aspect, the inside flange portion and the outside flange portion of the bracket are joined to the floor panel. Therefore, when an input load in substantially the vehicle width direction is applied to the bracket via the battery frame when a side collision of the vehicle occurs, the joint between the inside flange portion and the floor panel and the joint between the outside flange portion and the floor panel receive this load mainly as a shearing load.

On one side in the vehicle width direction where the side collision of the vehicle occurred, the bracket will not separate from the floor panel because it is basically pressed on and sandwiched between the surrounding members. Therefore, in the description below, the operation of the bracket and the like provided on the other side in the vehicle width direction of the vehicle (i.e., the side opposite the side where the side collision occurred) will be described.

In the aspect described above, the joint strength between the outside flange portion and the floor panel is set to be greater than the joint strength between the inside flange portion and the floor panel, so the joint between the inside flange portion and the floor panel will separate before the joint between the outside flange portion and the floor panel will. At this time, some of the energy when the collision occurs is absorbed by the joint between the inside flange portion and the floor panel separating, and the bracket rotates while bending with an area near the end portion on the inside in the vehicle width direction of the outside flange portion as the bending starting point. Also, when the bracket rotates, the outside flange portion receives a load in the direction in which it is pushed toward the floor panel, so some of the energy when the collision occurs is absorbed by the deformation of the bracket. As a result, a shearing load that is applied to the joint between the outside flange portion and the floor panel is reduced, so the joint between the outside flange portion and the floor panel can be prevented or effectively inhibited from breaking.

In the structure of the aspect described above, a reinforcing member may be joined to a lower surface of the floor panel, and the outside flange portion may be arranged sandwiched between the floor panel and the reinforcing member.

According to this structure, even if the joint between the outside flange portion and the floor panel were to separate when an input load when a side collision occurs is applied to the bracket, the outside flange portion would basically remain sandwiched by the floor panel and the reinforcing member. In other words, the outside flange portion will not separate from the floor panel as long as it (i.e., the outside flange portion) remains sandwiched between the floor panel and the reinforcing member.

In the structure described above, the inside flange portion and the floor panel may be overlapped to form a two-layered portion and spot welded together at the two-layered portion, and the reinforcing member, the outside flange portion and the floor panel may be overlapped to form a three-layered portion and spot welded together at the three-layered portion.

According to this structure, the strength of the joint between the reinforcing member, the outside flange portion, and the floor panel that are overlapped with each other to form the three-layered portion and spot welded together at this three-layered portion is set to be greater than the strength of the joint between the inside flange portion and the floor panel that are overlapped with each other to form the two-layered portion and spot welded together at this two-layered portion. Therefore, when an input load when a side collision occurs is applied to the bracket and the joint between the inside flange portion and the floor panel separates, the joint between the outside flange portion and the floor panel remains intact.

Also, the reinforcing member, the outside flange portion, and the floor panel are overlapped to form the three-layered portion and spot welded together there, so the rigidity is set to be different between the three-layered portion that includes a portion of the bracket, and a portion of the bracket that is a continuous with the three-layered portion and arranged on the inside in the vehicle width direction. Therefore, when the joint between the inside flange portion and the floor panel separates, the bracket rotates while bending with an area near a portion where this difference in rigidity is set, that is farther to the inside in the vehicle width direction than the spot weld of the three-layered portion, as the bending starting point. As a result, the shearing load that is applied to the spot weld of the three-layered portion is able to be effectively suppressed.

In the structure described above, a bent portion that is bent substantially downward from an end portion on the inside in the vehicle width direction of the outside flange portion may be formed on the bracket, and an end portion on the inside in the vehicle width direction of a portion of the reinforcing member that overlaps with the outside flange portion may be arranged in a position adjacent to the bent portion.

According to this structure, when the joint between the inside flange portion and the floor panel separates when a side collision of the vehicle occurs, the upper end portion of the side wall on the bent portion side of the bracket is supported by the end portion on the inside in the vehicle width direction of the reinforcing member. As a result, the bracket rotates while bending in a stable deformation mode with the end portion on the inside in the vehicle width direction of the reinforcing member as the fulcrum and the bent portion as the bending starting point. Also, if the upper end portion of the side wall on the bent portion side of the bracket pushes on the end portion on the inside in the vehicle width direction of the reinforcing member and the reinforcing member consequently deforms, some of the energy when the collision occurs will be absorbed as a result.

In the structure described above, the inside flange portion and the outside flange portion may be spot welded to the floor panel such that a number of spot weld points where the outside flange portion and the floor panel are spot welded together may be greater than the number of spot weld points where the inside flange portion and the floor panel are spot welded together.

According to this structure, even if the same number of welds between the outside flange portion and the floor panel as the number of welds between the inside flange portion and the floor panel were to break, a portion of the welds between the outside flange portion and the floor panel would remain intact without breaking.

As described above, the vehicular battery mounting structure according to the aspect of invention is able to prevent or effectively suppress separation of the battery frame from the floor panel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
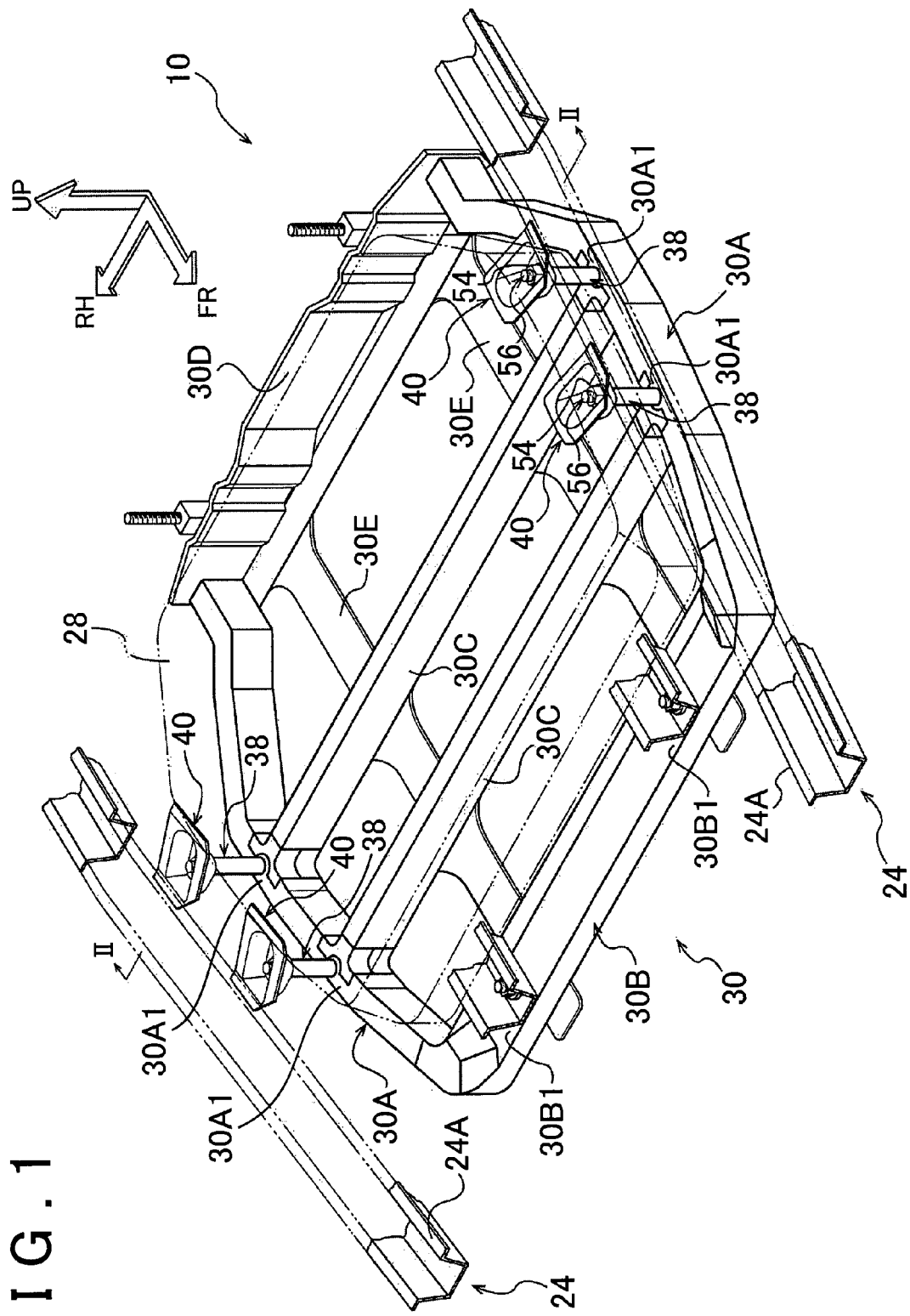
FIG. 1 is a perspective view of a portion of a vehicular battery mounting structure according to one example embodiment of the invention.

A vehicular battery mounting structure according to an example embodiment of the invention will he described with reference to FIGS. 1 to 4. In the drawings, arrows FR, UP, and RH shown appropriately indicate directions toward the front of the vehicle, upward with respect to the vehicle, and the right side of the vehicle, respectively.

Figure 2:
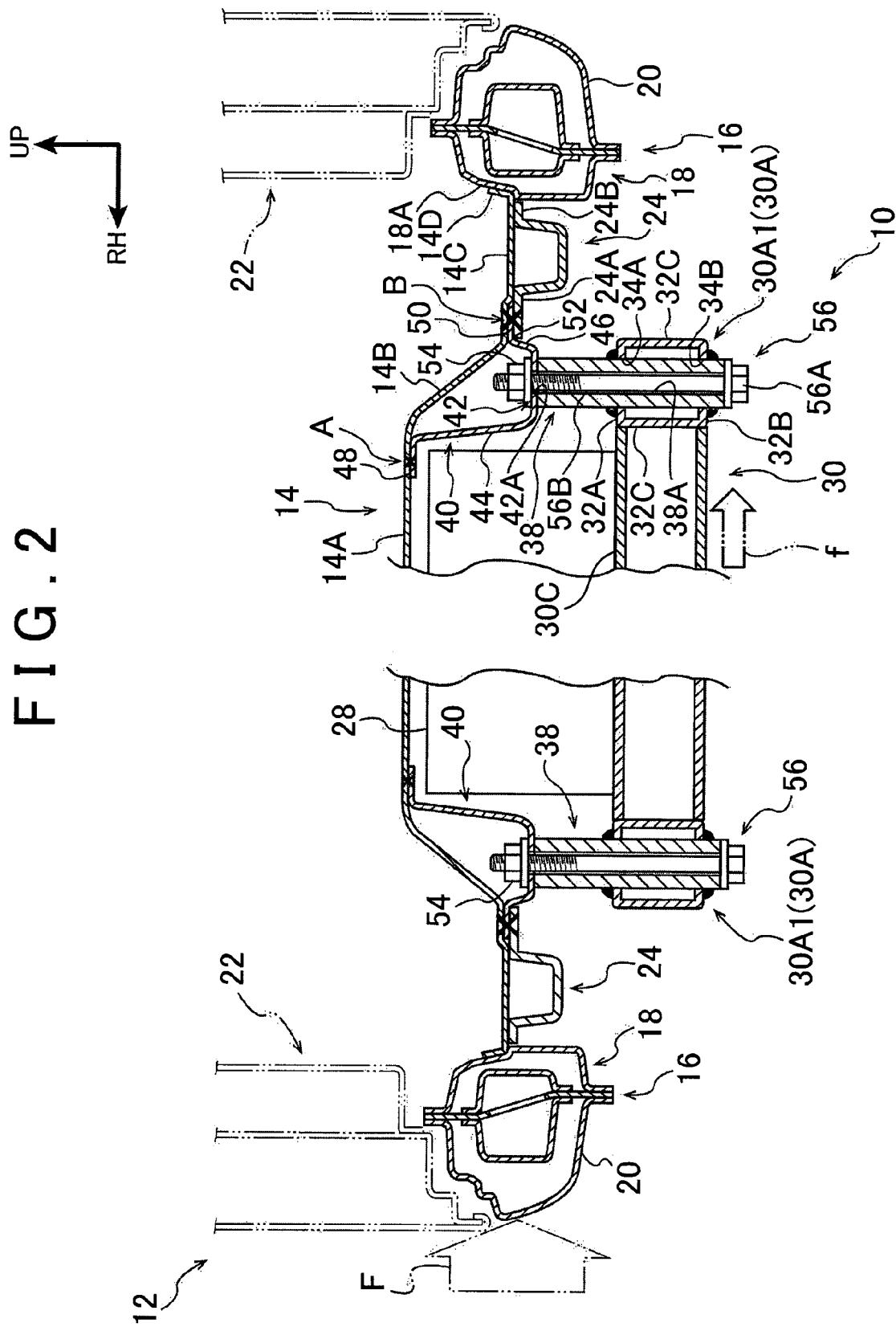
FIG. 2 is a sectional view, as viewed from the front of a vehicle, of the vehicular battery mounting structure according to the example embodiment of the invention, that corresponds to an enlarged sectional view taken along line II-II in FIG. 1.

FIG. 1 is a perspective view of a portion of a vehicular battery mounting structure 10 according to this example embodiment, and FIG. 2 is a sectional view, as viewed from the front of the vehicle, of the vehicular battery mounting structure 10, that corresponds to an enlarged sectional view taken along line II-II in FIG. 1. In FIG. 2, a middle portion in a vehicle width direction is omitted. Also, the structures on the left and right sides in the drawing are bilaterally symmetrical with respect to a fracture line in FIG. 2. Therefore, only the structural portions on the right side in the drawing (i.e., the left side of the vehicle) in FIG. 2 are denoted by reference characters. Reference characters denoting the structural portions on the left side in the drawing (i.e., the right side of the vehicle) are suitably omitted. Also, to simplify the description, portions that are provided in plurality (such as on each side of the vehicle) may be referred to in the singular.

A vehicle 12 to which the vehicular battery mounting structure 10 shown in FIG. 2 has been applied is an electric vehicle that runs using an electric motor, not shown, as a driving source, and is provided with a floor panel 14 that forms a vehicle body floor. The floor panel 14 has a stepped shape in which a general floor portion 14A is raised slightly compared with a side portion 14C that is an end portion on an outside in the vehicle width direction. As a result, when a battery pack (i.e., a battery) 28 is mounted below the general floor portion 14A, a space corresponding to the height of the battery pack 28 is ensured. The general floor portion 14A is connected to the side , portion 14C by an inclined portion 14B, and this inclined portion 14B slopes downward toward the outside in the vehicle width direction.

Also, a rocker 16 (also referred to as a "side sill") is arranged with a vehicle longitudinal direction as a length direction, on both sides on the outside in the vehicle width direction with respect to the floor panel 14. Each rocker 16 includes a rocker inner panel 18 and a rocker outer panel 20, and forms a closed sectional structure. A terminal portion 14D (an extended portion that extends from the side portion 14C) of the floor panel 14 is joined by spot welding to an upper portion of a side wall portion 18A of the rocker inner panel 18.

The rocker 16 forms a lower edge portion of a door opening that is opened and closed by a side door 22. Also, a pillar, not shown, having a closed sectional structure is provided erect in substantially a vehicle vertical direction to the front and rear of the door opening in the longitudinal direction of the vehicle.

A floor under reinforcement 24 that serves as a reinforcing member is arranged with the vehicle longitudinal direction as the length direction, on a lower surface of the side portion 14C of the floor panel 14. The floor under reinforcement 24 is formed in a generally upside-down hat-shape, in which the sectional shape opens upward with respect to the vehicle in the sectional view taken along the vehicle width direction. A first flange portion 24A that extends toward the inside in the vehicle width direction, and a second flange portion 24B that extends, toward the outside in the vehicle width direction are formed on upper ends of the floor under reinforcement 24. The first flange portion 24A and the second flange portion 24B are joined by spot welding to the lower surface of the side portion 14C of the floor panel 14. The joint between the first flange portion 24A and the floor panel 14 will be described in detail later.

A battery frame 30 is arranged below the floor panel 14 and farther to the inside in the vehicle width direction than the floor under reinforcement 24. The battery frame 30 is used to mount and protect the battery pack 28, and supports the battery pack 28 from below. The battery pack 28 is fixed to the battery frame 30 by bolts, not shown, or the like. The battery pack 28 is a battery pack in which a plurality of secondary cells, not shown, that are able to discharge and charge are housed inside of a case. This battery pack 28 is used to supply electric power to the electric motor, not shown, of the vehicle 12.

As shown in FIG. 1, the battery frame 30 includes a pair of left and right side frames 30A arranged with substantially the vehicle longitudinal direction being the length direction. End portions on the front side in the vehicle longitudinal direction of this pair of left and right side frames 30A are connected together by a front cross member 30B that extends in the vehicle width direction. Middle portions in the vehicle longitudinal direction of the pair of left and right side frames 30A are connected together by a plurality of sub cross members 30C that extend in the vehicle width direction. Also, end portions on the rear side in the vehicle longitudinal direction of the pair of left and right side frames 30A are connected together by a backboard 30D that extends in the vehicle width direction. Meanwhile, lower end portions of the front cross member 30B, the sub cross members 30C, and the backboard 30D are connected together by a plurality of under members 30E that extend in the vehicle longitudinal direction.

Accordingly, the side frames 30A, the front cross member 30B, and the backboard 30D of the battery frame 30 are joined in a frame-shape, and the battery pack 28 is arranged on an inner peripheral side of this frame-shaped portion when viewed from above the vehicle. In FIG. 1, the outer shape of the battery pack 28 is shown by an alternate long and two short dashes line. Attaching portions 30A1 and 30B1 that attach to the floor panel 14 (see FIG. 2) are provided on the side frames 30A and the front cross member 30B. Hereinafter, the attaching portions 30A1 of the side frames 30A will be described in detail.

As shown in FIG. 2, each of the side frames 30A of the battery frame 30 is an angular tube-shaped member that is formed in a sectional rectangular shape and includes an upper wall portion 32A, a lower wall portion 32B, and side wall portions 32C. A pair of upper and lower collar insertion holes 34A and 34B that extend through the upper wall portion 32A and the lower wall portion 32B, respectively, in the vertical direction of the vehicle is formed through in positions on the same axis in the attaching portion 30A1 of the side frame 30A. A collar 38 (an element that can be understood to be a connecting member in a broad sense) is inserted through these collar insertion holes 34A and 34B.

The collar 38 is formed in a circular cylindrical shape, and a bolt insertion hole 38A is formed in an axial center portion thereof. An outer peripheral surface of the center portion in the axial direction of the collar 38 is joined by arc-welding to an upper surface of an outer peripheral portion of the collar insertion hole 34A in the upper wall portion 32A of the side frame 30A. Also, an outer peripheral surface near a lower end portion of the collar 38 is joined by arc-welding to a lower surface of an outer peripheral portion of the collar insertion hole 34B in the lower wall portion 32B of the side frame 30A. Moreover, an upper surface of an upper end portion of the collar 38 is abutted against a bottom wall portion 42 of a bracket 40.

The bracket 40 is a vehicle body side member that is provided on both the left and right sides of the vehicle, interposed between a portion on the outside in the vehicle width direction of the floor panel 14 and a portion on the outside in the vehicle width direction of the battery frame 30. The bracket 40 is joined to the floor panel 14 and is not assumed to be detachable from the floor panel 14. Also, the bracket 40 has a generally upside-down hat-shape (an open sectional shape in a broad sense) and a sectional shape of the bracket 40 opens upward in the sectional view taken along the vehicle width direction. That is, the bracket 40 is formed by a bottom wall portion 42, side wall portions 44 and 46, an inside flange portion 48, and an outside flange portion 50. More specifically, the upper portion of the bracket 40 is open, and the lower portion that is on the side opposite the open side is formed by the bottom wall portion 42. The side wall portions 44 and 46 are provided so as to stand erect substantially upward from both ends in the vehicle width direction of the bottom wall portion 42. The inside flange portion 48 is formed bent toward the inside in the vehicle width direction from the upper end portion of the side wall portion 44 on the inside in the vehicle width direction, and the outside flange portion 50 is formed bent toward the outside in the vehicle width direction from the upper end portion of the side wall portion 46 on the outside in the vehicle width direction.

A bolt insertion hole 42A is formed through in a position on the same axis as the bolt insertion hole 38A of the collar 38, in the bottom wall portion 42 of the bracket 40. A weld nut 54 is fixed to the upper surface of an outer peripheral portion of the bolt insertion hole 42A of the bottom wall portion 42. Meanwhile, a shaft portion 56B of a bolt 56 is inserted through the bolt insertion holes 38A and 42A from below the collar 38, and a male threaded portion of the shaft portion 56B of the bolt 56 that has passed through the collar 38 and the bottom wall portion 42 of the bracket 40 is screwed into a female threaded portion of the weld nut 54. As a result, the collar 38 and the bottom wall portion 42 of the bracket 40 are fastened between a head 56A of the bolt 56 and the weld nut 54. That is, a portion (i.e., the side frame 30A) on the outside in the vehicle width direction of the battery frame 30 is indirectly fixed to the bottom wall portion 42 of the bracket 40 via the collar 38.

With this fixation structure, by having the weld nut 54 fixed to the bottom wall portion 42 of the bracket 40, the battery frame 30 is able to be attached and detached to and from the floor panel 14 side without fixing the weld nut 54 to the upper surface of the floor panel 14.

The bracket 40 is such that the inside flange portion 48 that is formed on the inside in the vehicle width direction is joined to the general floor portion 14A of the floor panel 14, and the outside flange portion 50 that is formed on the outside in the vehicle width direction is joined to the side portion 14C of the floor panel 14. In other words, the inside flange portion 48 is joined to the floor panel 14 in a higher position in the vertical direction of the vehicle than the outside flange portion 50. Therefore, with the bracket 40, the length, when viewed from the front of the vehicle, of the side wall portion 44 that connects the bottom wall portion 42 to the inside flange portion 48 is set to be longer than the length, when viewed from the front of the vehicle, of the side wall portion 46 that connects the bottom wall portion 42 to the outside flange portion 50. The side wall portion 44 that is on the inside in the vehicle width direction points upward and is inclined slightly toward the inside in the vehicle width direction. The side wall portion 46 that is on the outside in the vehicle width direction points upward and is inclined slightly toward the outside in the vehicle width direction.

Also, the inside flange portion 48 overlaps with the floor panel 14 (i.e., the general floor portion 14A) to form a two-layered portion and the two are spot welded together at this two-layered portion. In contrast, the outside flange portion 50 is arranged sandwiched between the floor panel 14 (i.e., the side portion 14C) and the floor under reinforcement 24 (i.e., the first flange portion 24A), and the floor under reinforcement 24, the outside flange portion 50, and the floor panel 14 are overlapped with each other to form a three-layered portion and spot welded together at this three-layered portion.

Figure 3:
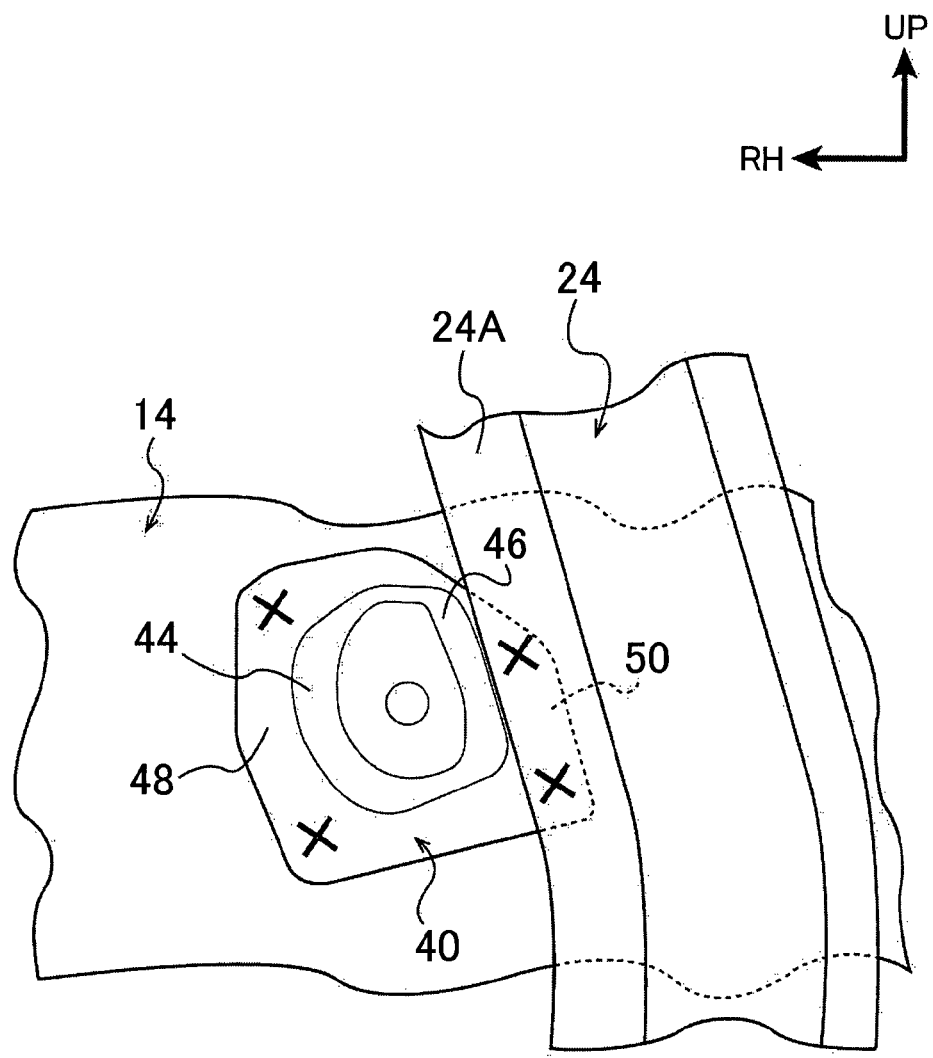
FIG. 3 is a bottom view of the joint between a bracket and a floor panel in the example embodiment of the invention.

FIG. 3 is a bottom view showing the joint between the bracket 40 and the floor panel 14 side. In the drawing, the positions of the spot welding points are indicated by an "X". As shown in FIG. 3, there are two spot welds, one forward of the center position of the bracket 40 and the other to the rear of the center position of the bracket 40, between the inside flange portion 48 and the floor panel 14. Also, there are two spot welds, one forward of the center position of the bracket 40 and the other to the rear of the center position of the bracket 40, between the floor under reinforcement 24, the outside flange portion 50, and the floor panel 14.

Accordingly, with the bracket 40 shown in FIG. 2, the joint strength between the outside flange portion 50 and the floor panel 14 is set to be greater than the joint strength between the inside flange portion 48 and the floor panel 14. Furthermore, the rigidity of the three-layered portion that includes a portion of the bracket 40 is different from the rigidity of the portion of the bracket 40 that is continuous with the three-layered portion and arranged on the inside in the vehicle width direction (i.e., the side wall portion 46 and the like).

Also, an end portion (i.e., a terminal surface) on the inside in the vehicle width direction of the first flange portion 24A of the floor under reinforcement 24 that overlaps with the outside flange portion 50 is arranged in a position adjacent to a bent portion 52 that is bent substantially downward from an end portion on the inside in the vehicle width direction of the outside flange portion 50. In other words, the rigidity of the three-layered portion that includes the outside flange portion 50 of the bracket 40 is different from the rigidity of the continuous portion thereof (i.e., the side wall portion 46 and the like) on the inside in the vehicle width direction, with an area near the retaining piece 52 as the boundary. Also, the end portion on the outside in the vehicle width direction of the first flange portion 24A is arranged overlapping with the side portion 14C of the floor panel 14 to form a two-layered portion.

Next, the operation and effects when a side collision of the vehicle 12 occurs will be described. In this side collision, the bracket 40 near the vehicle body side portion on the side where the side collision occurs (i.e., the left side in FIG. 2) is basically pushed on and sandwiched by the surrounding members, and thus does not separate from the floor panel 14 side. Therefore, in the description below, the operation of the bracket 40 and the like provided near the vehicle body side portion on the side opposite the side where the side collision of the vehicle 12 occurs (i.e., the right side in FIG. 2) will be described.

As shown in FIG. 2, when a side collision of the vehicle 12 occurs and a collision load F is consequently input to the vehicle body side portion, a load f that is transferred in substantially the vehicle width direction via the rocker 16 and the like is applied to the battery frame 30. Then when this load f is applied to the bracket 40 via the collar 38, the input load is mainly input as a shearing load at a joint A between the floor panel 14 and the inside flange portion 48 of the bracket 40, and a joint B between the floor panel 14 and the outside flange portion 50 of the bracket 40.

Here, at the joint A, the inside flange portion 48 and the floor panel 14 are overlapped with each other to form the two-layered portion and spot welded together at this two-layered portion. At the joint B, the floor under reinforcement 24, the outside flange portion 50, and the floor panel 14 are overlapped with each other to form the three-layered portion and spot welded together at this three-layered portion. Therefore, the strength of the joint where the floor under reinforcement 24, the outside flange portion 50, and the floor panel 14 are spot welded together at the three-layered portion is greater than the strength of the joint where the inside flange portion 48 and the floor panel 14 are spot welded together at the two-layered portion.

Figure 4:
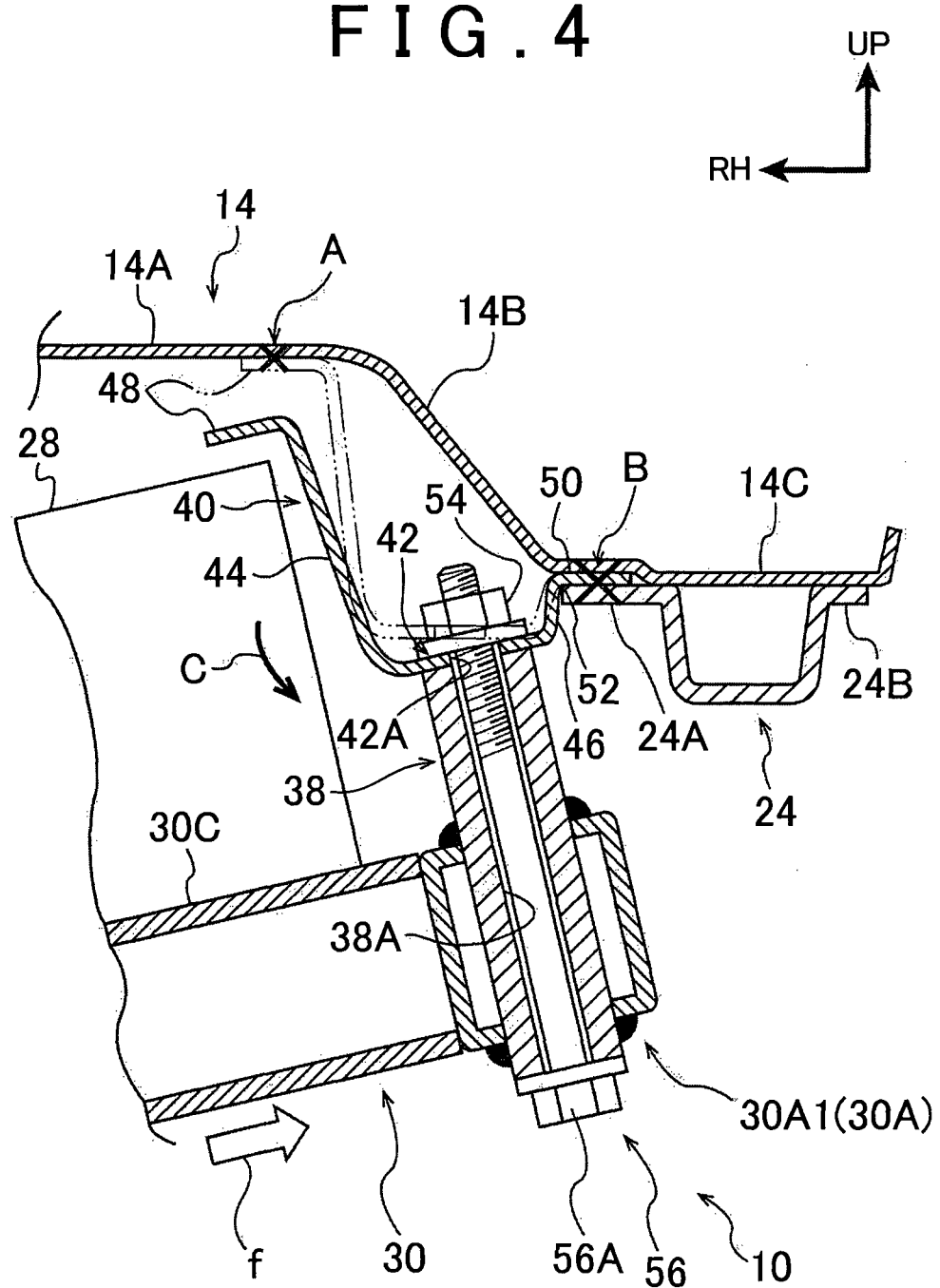
FIG. 4 is a sectional view, as viewed from the front of the vehicle, of the bracket deformed as a result of side collision.

Therefore, the joint strength between the outside flange portion 50 and the floor panel 14 is set to be greater than the joint strength between the inside flange portion 48 and the floor panel 14, so the inside flange portion 48 will separate from the floor panel 14 before the outside flange portion 50 will, as shown in FIG. 4. At this time, some of the energy at the time of the collision is absorbed by the joint between the inside flange portion 48 and the floor panel 14 separating.

Also, the joint between the inside flange portion 48 and the floor panel 14 will separate when the spot weld between the inside flange portion 48 and the floor panel 14 breaks. However, the joint between the outside flange portion 50 and the floor panel 14 will break only when both the spot weld between the outside flange portion 50 and the floor panel 14 and the spot weld between the outside flange portion 50 and the floor under reinforcement 24 break. In other words, the joint between the outside flange portion 50 and the floor panel 14 will remain intact as long as both the spot weld between the outside flange portion 50 and the floor panel 14, and the spot weld between the outside flange portion 50 and the floor under reinforcement 24 do not break.

Also, with the vehicular battery mounting structure 10 according to this example embodiment, the floor under reinforcement 24, the outside flange portion 50, and the floor panel 14 are overlapped with each other to form the three-layered portion and spot welded together at this three-layered portion, so the rigidity of the three-layered portion that includes the outside flange portion 50 of the bracket 40 is different from the rigidity of the continuous portion thereof (i.e., the side wall portion 46) on the inside in the vehicle width direction. Therefore, when the joint between the inside flange portion 48 and the floor panel 14 separates, the bracket 40 tries to rotate while bending (see the direction of arrow C) with the area near the boundary of this difference in rigidity as the starting point.

Also, as shown in FIG. 2, the first flange portion 24A of the floor under reinforcement 24 that forms one layer of the three-layered portion is such that the end portion thereof on the inside in the vehicle width direction is arranged in a position adjacent to the bent portion 52 of the bracket 40. Therefore, as shown in FIG. 4, when the joint between the inside flange portion 48 and the floor panel 14 separates, the upper end portion of the side wall portion 46 of the bracket 40 is supported by the end portion on the inside in the vehicle width direction of the first flange portion 24A of the floor under reinforcement 24.

Meanwhile, by setting the position of the end portion on the inside in the vehicle width direction of the first flange portion 24A as described above, the boundary of the difference in rigidity between the three-layered portion and the continuous portion (i.e., the side wall portion 46 of the bracket 40) on the inside in the vehicle width direction of the three-layered portion is set to be near the bent portion 52 of the bracket 40. Accordingly, when the joint between the inside flange portion 48 and the floor panel 14 separates, the bracket 40 bends with the end portion on the inside in the vehicle width direction of the first flange portion 24A as the fulcrum and with the bent portion 52 as the bending starting point. As a result, the bracket 40 rotates while bending in a stable deformation mode.

Also, when the bracket 40 deforms in the bending direction with the bent portion 52 as the bending starting point, the outside flange portion 50 receives a load in the direction in which it is pushed toward the floor panel 14. Also, some of the energy when the collision occurs is absorbed by the deformation of the bracket 40.

According to the plurality of operations described above, the shearing load applied to the outside flange portion 50 and the floor panel 14 is effectively reduced. Therefore, breaking of the joint B between the outside flange portion 50 and the floor panel 14 is able to be prevented or effectively suppressed.

The upper end portion of the side wall portion 46 of the outside flange portion 50 pushes on the end portion on the inside in the vehicle width direction of the first flange portion 24A of the floor under reinforcement 24, and when the first flange portion 24A side deforms, some of the energy when the collision occurs is consequently absorbed.

Also, in this example embodiment, the outside flange portion 50 is arranged sandwiched between the floor panel 14 and the floor under reinforcement 24, so even if the joint between the outside flange portion 50 and the floor panel 14 were to separate (not shown) when the load f is applied to the bracket 40, the outside flange portion 50 would basically remain sandwiched between the floor panel 14 and the floor under reinforcement 24 (i.e., would be caught and thus not pull out). That is, the outside flange portion 50 will not separate from the floor panel 14 as long as the outside flange portion 50 remains sandwiched by the floor panel 14 and the floor under reinforcement 24.

As described above, with the vehicular battery mounting structure 10 according to this example embodiment, it is possible to prevent or effectively suppress separation of the battery frame 30 from the floor panel 14.

Also, the stroke of the battery frame 30 is able to be lengthened by the bracket 40 rotating when a side collision occurs, so the input of the load f to the battery pack 28 can be mitigated. Furthermore, the vehicular battery mounting structure 10 according to this example embodiment is a structure that does not require the bracket 40 to be made larger, so an increase in mass and cost are also able to he suppressed.

In the example embodiment described above, the side frame 30A of the battery frame 30 is indirectly fixed via the collar 38 to the bottom wall portion 42 of the bracket 40, as shown in FIG. 2, but a structure in which a portion on the outside in the vehicle width direction of the battery frame 30 is directly fixed by a bolt or the like to the bottom wall portion 42 of the bracket 40 is also possible.

Also, as a modified example of the foregoing example embodiment, a structure in which the number of spot weld points (such as three) where the floor under reinforcement 24 (i.e., the first flange portion 24A), the outside flange portion 50, and the floor panel 14 are spot welded together is greater than the number of spot weld points (such as two) where the inside flange portion 48 and the floor panel 14 shown in FIG. 3 are spot welded together may be employed. For example, in addition to the spot weld point positions (each of which is indicated by an "X") between the floor panel 14, the outside flange portion 50, and the floor under reinforcement 24 (i.e., the first flange portion 24A) shown in FIG. 3, a spot weld point position may also be set between these point positions. As a result, the outside flange portion 50 tends to resist separating from the floor panel 14 side even more.

Also, as another modified example, a structure in which the outside flange portion 50 is joined by spot welding only to the floor panel 14, and the number of spot weld points (such as three) where the outside flange portion 50 and the floor panel 14 are spot welded together is greater than the number of spot weld points (such as two) where the inside flange portion 48 and the floor panel 14 are spot welded together may be employed. With this kind of structure, even if the same number of welds between the outside flange portion 50 and the floor panel 14 as the number of welds between the inside flange portion 48 and the floor panel 14 were to break, a portion of the welds between the outside flange portion 50 and the floor panel 14 would remain intact without breaking.

Further, as another modified example, with the same arrangement as shown in FIG. 2, for example, the outside flange portion 50 and the floor panel 14 may be spot welded (at two points, for example) at the three-layered portion where the floor panel 14, the outside flange portion 50, and the first flange portion 24A of the floor under reinforcement 24 overlap, and the floor panel 14 and the first flange portion 24A of the floor under reinforcement 24 may be spot welded together (at two points, for example) at the portion where they overlap.

Also, in the example embodiment described above, the inside flange portion 48 and the outside flange portion 50 of the bracket 40 are joined by spot welding to the floor panel 14, but the inside flange portion and the outside flange portion of the bracket may also be joined to the floor panel by another joining mode, such as by adhering or fastening.

Also, in the example embodiment described above, the floor under reinforcement 24 that serves as a reinforcing member is joined to the lower surface of the outside flange portion 50, but the reinforcing member that is joined to the lower surface of the outside flange portion 50 may also be another reinforcing member such as another reinforcement or a reinforcing bracket or the like. Also, the reinforcing member does not have to be arranged on the lower surface of the outside flange portion 50 as long as the joint strength between the outside flange portion 50 and the floor panel 14 is set to be greater than the joint strength between the inside flange portion 48 and the floor panel 14.

Also, as a modified example of the foregoing example embodiment, for example, a first flange portion of a floor under reinforcement may be arranged on the upper surface side of the outer flange portion of the bracket, and the floor panel may be arranged on the upper surface side of the first flange portion.

Also, in the example embodiment described above, the floor under reinforcement 24 is such that the end portion on the inside in the vehicle width direction of the first flange portion 24A that overlaps with the outside flange portion 50 of the bracket 40 is arranged in a position adjacent to the bent portion 52 of the bracket 40. While this kind of structure is preferable, a structure in which the end portion on the inside in the vehicle width direction of the first flange portion is arranged below the middle portion in the vehicle width direction of the outside flange portion is also possible.

Further, in addition to a shape in which the positions in the vehicle vertical direction of the inside flange portion and the outside flange portion are aligned, a shape in which the positions in the vehicle vertical direction of the inside flange portion 48 and the outside flange portion 50 differ, as in the example embodiment described above, is also included in the concept of "generally hat-shape opening upward" in claim 1.

Moreover, in addition to a position that abuts against the bent portion, and an adjacent position substantially nearest to the bent portion 52, a position understood to be adjacent at a downward angle to the bent portion, yet slightly separated from the bent portion, is also included in the concept of a "position adjacent to the bent portion".

The example embodiments and the plurality of modified examples thereof may be carried out in any suitable combination.

The invention claimed is:

1. A vehicular battery mounting structure comprising:
a floor panel that forms a vehicle body floor;
a battery frame that is arranged below the floor panel and supports a battery; and
a bracket that is provided on both left and right sides of a vehicle, each bracket interposed between the floor panel and the battery frame, each bracket includes a bottom wall portion, an inside flange portion that is on an inside in a vehicle width direction, and an outside flange portion that is on an outside in the vehicle width direction, a sectional shape of each bracket opens upward in a sectional view taken along the vehicle width direction, wherein the battery frame is indirectly or directly fixed to the bottom wall portions, the inside flange portions and the outside flange portions are joined to the floor panel, and a joint strength between the outside flange portions and the floor panel is greater than a joint strength between the inside flange portions and the floor panel.

2. The vehicular battery mounting structure according to claim 1, wherein a reinforcing member is joined to a lower surface of the floor panel, and the outside flange portions are arranged sandwiched between the floor panel and the reinforcing member.

3. The vehicular battery mounting structure according to claim 2, wherein the inside flange portions and the floor panel are overlapped to form a two-layered portion and spot welded together at the two-layered portion, and the reinforcing member, the outside flange portions, and the floor panel are overlapped to form a three-layered portion and spot welded together at the three-layered portion.

4. The vehicular battery mounting structure according to claim 2, wherein a bent portion that is bent substantially downward from an end portion on the inside, in the vehicle width direction, of the outside flange portions are formed on each bracket; and an end portion on the inside, in the vehicle width direction, of a portion of the reinforcing member that overlaps with the outside flange portions are arranged in a position adjacent to the bent portion.

5. The vehicular battery mounting structure according to claim 1, wherein the inside flange portions and the outside flange portions are spot welded to the floor panel such that a number of spot weld points where the outside flange portions and the floor panel are spot welded together is greater than the number of spot weld points where the inside flange portions and the floor panel are spot welded together.

6. The vehicular battery mounting structure according to claim 2, wherein the inside flange portions and the outside flange portions are spot welded to the floor panel such that a number of spot weld points where the outside flange portions and the floor panel are spot welded together is greater than the number of spot weld points where the inside flange portions and the floor panel are spot welded together.

7. The vehicular battery mounting structure according to claim 3, wherein the inside flange portions and the outside flange portions are spot welded to the floor panel such that a number of spot weld points where the outside flange portions and the floor panel are spot welded together is greater than the number of spot weld points where the inside flange portions and the floor panel are spot welded together.

8. The vehicular battery mounting structure according to claim 4, wherein the inside flange portions and the outside flange portions are spot welded to the floor panel such that a number of spot weld points where the outside flange portions and the floor panel are spot welded together is greater than the number of spot weld points where the inside flange portions and the floor panel are spot welded together.

* * * * *